(12) United States Patent  (10) Patent No.: US 9,170,791 B1
Ciubotariu  (45) Date of Patent: Oct. 27, 2015

(54) STORING DATA ITEMS WITH CONTENT ENCODED IN STORAGE ADDRESSES

(75) Inventor: Mircea Ciubotariu, Marina del Rey, CA (US)

(73) Assignee: Symantec Corporation, Mountain View, CA (US)

( * ) Notice: Subject to any disclaimer, the term of this patent is extended or adjusted under 35 U.S.C. 154(b) by 1367 days.

(21) Appl. No.: 12/956,911

(22) Filed: Nov. 30, 2010

(51) Int. Cl.
*G06F 7/74* (2006.01)
*G06F 9/45* (2006.01)

(52) U.S. Cl.
CPC ............... *G06F 8/4434* (2013.01); *G06F 7/74* (2013.01); *G06F 2212/401* (2013.01)

(58) Field of Classification Search
CPC .... G06F 7/74; G06F 8/4434; G06F 2212/401
See application file for complete search history.

(56) References Cited

U.S. PATENT DOCUMENTS

| 5,539,682 | A  | * | 7/1996  | Jain et al.      | 708/200 |
|-----------|-----|---|---------|------------------|---------|
| 5,790,131 | A  | * | 8/1998  | Liang et al.     | 345/660 |
| 5,930,387 | A  | * | 7/1999  | Chan et al.      | 382/166 |
| 6,356,214 | B1 | * | 3/2002  | McDonald et al.  | 341/68  |
| 2004/0083362 | A1 | * | 4/2004  | Park et al.   | 713/162 |
| 2006/0294343 | A1 | * | 12/2006 | Rejmaniak     | 712/227 |

* cited by examiner

*Primary Examiner* — Henry Tsai
*Assistant Examiner* — John Roche
(74) *Attorney, Agent, or Firm* — Brill Law Office; Jeffrey Brill

(57) ABSTRACT

An input dataset comprising a plurality of input items is transformed into a smaller output dataset comprising a plurality of corresponding output items. For each input item, a corresponding output item is created, wherein each input item contains some content that is not present in the corresponding output item. Creating an output item can comprise right shifting the bits of the input item by a shifting value, and performing an exclusive or operation on the input item and the results of the right shifting. The content contained in each input item that is not present in the corresponding output item is encoded in the storage address of the corresponding output item, such that the content of each input item is contained in a combination of the corresponding output item and its storage address. The output dataset comprises multiple levels.

20 Claims, 3 Drawing Sheets

STORING DATA ITEMS WITH CONTENT ENCODED IN STORAGE ADDRESSES

TECHNICAL FIELD

This disclosure pertains generally to data storage, and more specifically to efficiently storing a set of data items by encoding some of the data content in the storage addresses.

BACKGROUND

The storage of datasets can become very space intensive. Some datasets can comprise large numbers of items of uniform size. The size of such a dataset increases linearly as the number of items increases. For example, a set of malicious code signatures stored by an anti-malware system typically comprises an ever increasing number of anti-malware signatures of a fixed width (e.g., 32 bits). As such a dataset becomes larger, the download and use time for the dataset is affected, and the memory footprint and storage requirements increase.

It would be desirable to address these issues beyond the solutions provided by conventional compression technologies.

SUMMARY

An input dataset comprising a plurality of input items is transformed into a smaller output dataset comprising a plurality of corresponding output items. For each of the plurality of input items in the input dataset, a corresponding output item is created, wherein each input item contains some content that is not present in the corresponding output item. Thus, each input item has a width greater than that of the corresponding output item. In some embodiments creating an output item corresponding to an input item comprises applying a mixing function with a given shifting value to the input item. The mixing function can comprise right shifting the bits of the input item by the shifting value, and performing a bitwise exclusive or operation on the input item and the results of the right shifting. The content contained in each input item that is not present in the corresponding output item is encoded in a storage address of the corresponding output item. This encoding can be performed by assigning a specific number of least significant bits of the input item to the storage address of the output item, wherein the specific number comprises a difference in width between the input item and the corresponding output item. Each output item is stored at its storage address in the output dataset, such that the content of each input item is contained in a combination of the corresponding output item and its storage address.

The output items can be stored in a plurality of levels of the output dataset, wherein the first level contains a given number of output items of a given width, wherein each successive level contains output items of a greater or equal width, and wherein the number of items contained per level generally decreases with successive levels. A maximum number of output items that can be stored at each level of the output dataset can be calculated, as well as a related size exponent. An optimal shifting value can be determined for each level of the output dataset, for example by generating storage address for the remaining input items using possible shifting values, and identifying a shifting value that results in generating a maximum or greatest number of unique address for the remaining data items at the level.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
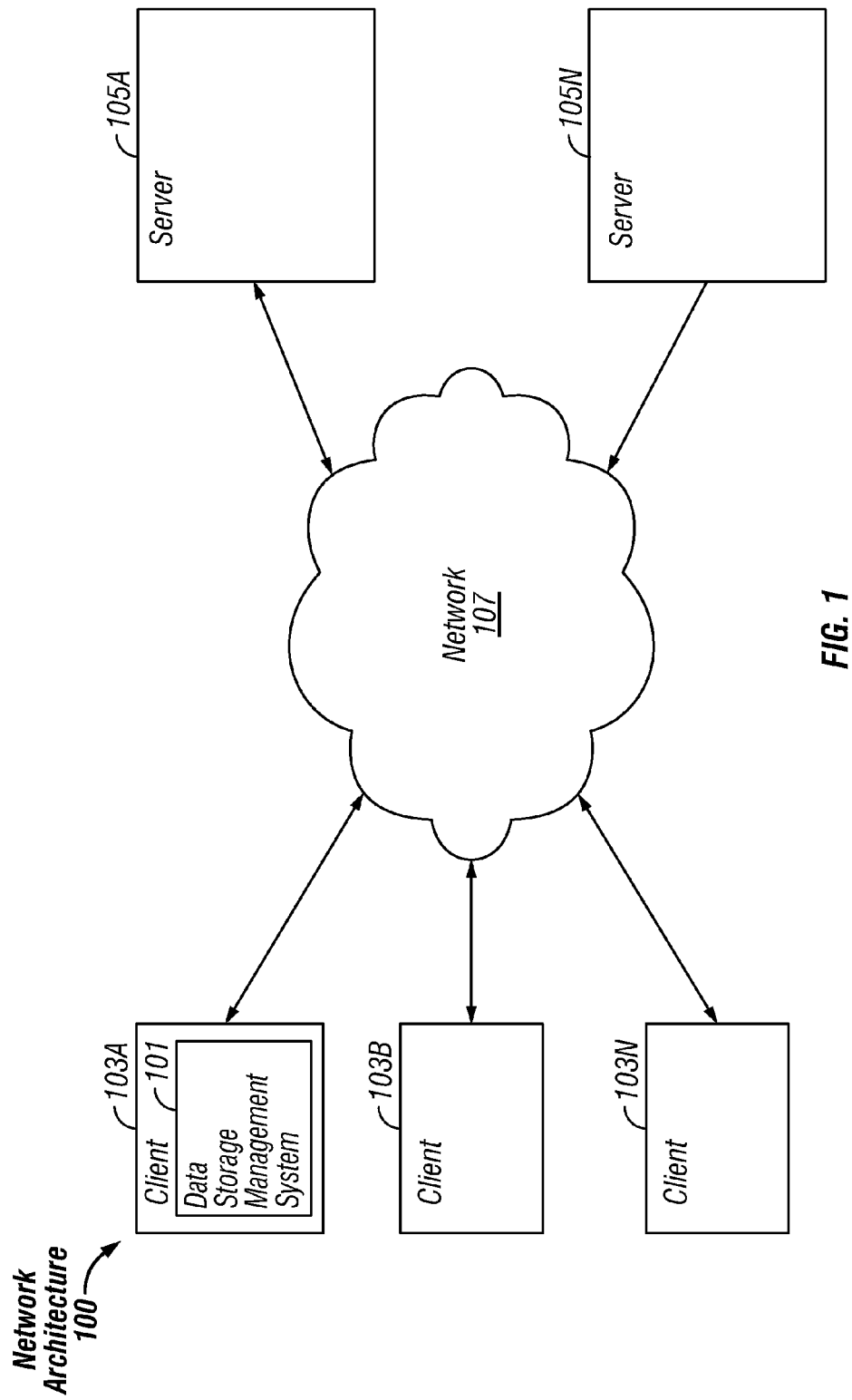
FIG. 1 is a block diagram of an exemplary network architecture in which a data storage management system can be implemented, according to some embodiments.

FIG. 1 is a block diagram illustrating an exemplary network architecture 100 in which a data storage management system 101 can be implemented. The illustrated network architecture 100 comprises multiple clients 103A, 103B and 103N, as well as multiple servers 105A and 105N. In FIG. 1, the data storage management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
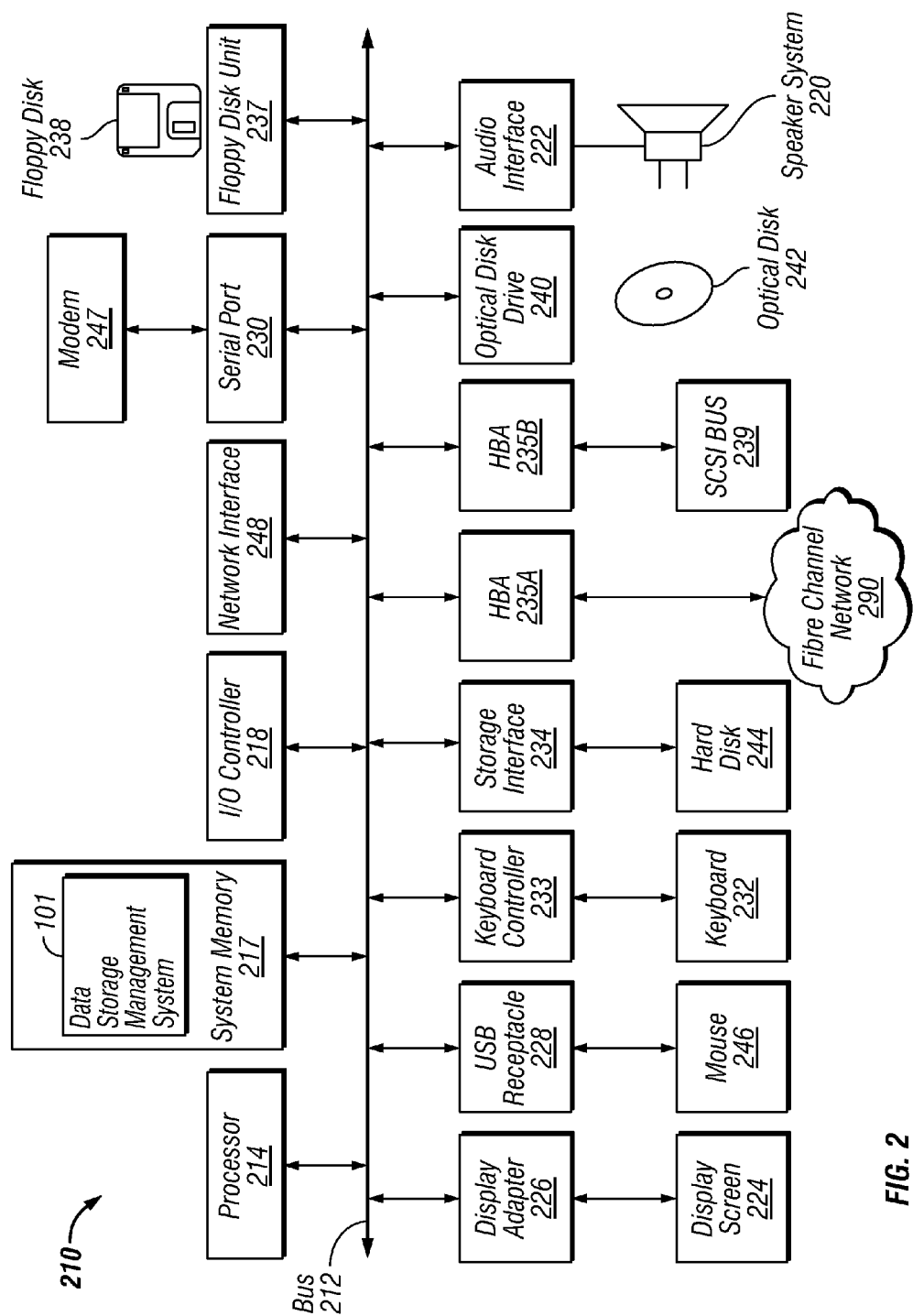
FIG. 2 is a block diagram of a computer system suitable for implementing a data storage management system, according to some embodiments.

FIG. 2 is a block diagram of a computer system 210 suitable for implementing a data storage management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the data storage management system 101 is illustrated as residing in system memory 217. The workings of the data storage management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
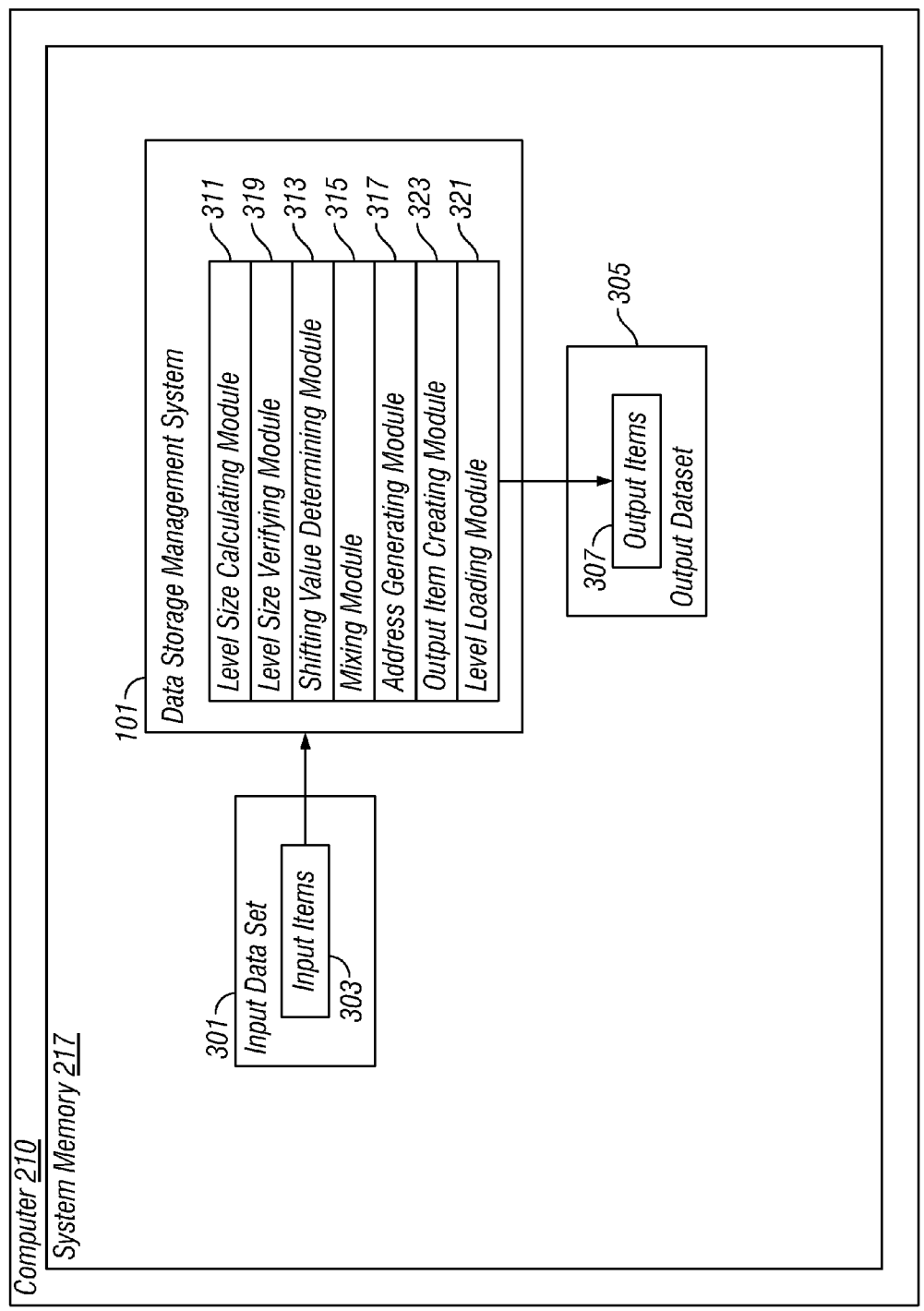
FIG. 3 is a block diagram of the operation of a data storage management system, according to some embodiments.

FIG. 3 illustrates the operation of a data storage management system 101 residing in the system memory 217 of a computer 210, according to some embodiments. As described above, the functionalities of the data storage management system 101 can reside on a client 103, a server 105, or be distributed between multiple computer systems 210, including within a cloud-based computing environment in which the functionality of the data storage management system 101 is provided as a service over a network 107. It is to be understood that although the data storage management system 101 is illustrated in FIG. 3 as a single entity, the illustrated data storage management system 101 represents a collection of functionalities, which can be instantiated as a single or multiple modules as desired (an instantiation of specific, multiple modules of the data storage management system 101 is illustrated in FIG. 3). It is to be understood that the modules of the data storage management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the data storage management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the data storage management system 101 takes an input dataset 301 of a certain size, and stores the data from the input dataset 301 such that it occupies less space, by encoding some of the content in the storage addresses. More specifically, the input dataset 301 comprises a set of a given number of items (referred to herein as input items 303) of a specific width (e.g., two bytes, four bytes, eight bytes). Each input item 303 is the same width, such that the storage size of the input dataset 301 is the product of the number of input items 303 and the input item width. The input dataset 301 can comprise any number of items 303 of any uniform width, and thus be of any storage size. Typically, the input dataset 301 contains no duplicate items 303. (A duplicate item 303 in the input dataset can be considered an error condition and ignored, i.e., not stored in the output dataset 305).

To store the data from the input dataset 301 in less space, the data storage management system 101 goes through the input dataset 301, and builds an output dataset 305 in the form of an array of arrays (referred to herein as levels). Each level in the output dataset 305 is in the form of an array (or other suitable data structure) storing the data from a subset of input items 303. To store the content of an input item 303 in a level, an output item 307 comprising a subset of the width of an input item 303 is used, with the remaining information of that input item 303 being encoded in the storage address (array index). Starting with the first level (referred to herein as the top level), each successive level stores fewer or the same number of output items 307, and uses more space to store each output item 307. In other words, successive levels use successively more bits to represent each output item 307, and thus encode successively less content in the storage addresses. Additionally, successive levels tend to store fewer output items 307. Although consecutive levels could store the same number of output items 307, the number of output items 307 stored per level generally tends to decrease with successive levels, such that the overall level size decreases exponentially.

For each level, a data transformation function called a mixing function is applied to the input items 303 not yet stored on a higher level. The mixing function, which is described in greater detail below, transforms input items 303 into output items 307 by shifting content bits from their positions to the right by a shifting value for the current level, and performing a bitwise exclusive or (XOR) operation on the original input item 303 and the result of the shift. A given number most significant bits of the result of the XOR operation becomes the output item 307, wherein the given number is the width of the input item 303 minus a size exponent for the current level (size exponents are explained in detail below). The result of the XOR operation is masked to retain only the size exponent number least significant bits, which are used as an index into an array of output items for the current level. In other words, where w is the width on an input item 303 and b is the size exponent for a given level, output items 307 for that level are w−b bits wide, and the remaining b bits of the data from the input item 303 are encoded in the address at which the output item 307 is stored (i.e., the index into the array of output items 307 for the current level). Thus, the width of an output item 307 at a given level is the width of an input item 303 minus the size exponent for that level. As explained in detail below, given an input dataset 301, a size exponent and a shifting value are determined for each level.

The number of output items 307 stored on a given level is equal to the number of unique addresses that can be generated as described above for the remaining input items 303 in the input dataset 301. Unless the width of output items 307 is the same as the width of input items 303 (in which case no storage savings would be achieved), not all input items 303 result in a unique address when mixed (i.e., when used as input to the mixing function). Thus, when mixing an input item 303 generates a unique address at a given level, the corresponding output item 307 is stored at that level using that address. If mixing a subsequent input 303 item results in an address already generated and used (a collision), that input item 303 is not stored at the current level, but is instead held for storage at a subsequent level at which more bits are used to store the data of output items 307, and thus fewer collisions result. The number of output items 307 stored on each level is a power of 2, more specifically 2 raised to the size exponent power (i.e., where b is the size exponent for level 1, 1 stores $2^b$ output items 307).

As described in more detail below, a size exponent is calculated for each level. To calculate a size exponent, a fraction of the remaining input items 303 to be stored at that level is estimated (typically ½ to ⅓, although other values are used in different embodiments). For each level, the optimal shifting value is determined by brute force. More specifically, each possible shifting value is tried, and the shifting value that results in the highest occupancy for that level is found (i.e., the fewest collisions and thus the storage of the highest number of remaining items). If a given shifting value being tried results in filling the level to its maximum occupancy, no more shifting values need to be tried. Otherwise, each possible shifting value is tried and the one that comes closest to filling the level is used. Note that the number of possible shifting values is equal to the width of the input data items 303, so the number of possible shifting values to try is finite. As described below, certain optimizations can be used at different points of this process.

The data storage management system 101 takes as input an array of n items of a given width (the input dataset 301). If m is the space required in bits to store all the items 303 in the input conventionally, the width of an input item 303 is log 2(m) bits. The size of the input dataset 303 is thus n*log 2(m) bits, where n is the number of input items 303. The data storage management system 101 transforms the input dataset 301 into an output dataset 307 of size n*(log 2(m)−log 2(n)+c) bits, where c is a constant representing the minimum number of bits required to store an item. This constant is typically between 2 and 3. Thus, the storage size savings gained by the data storage management system 101 is significant.

Still referring to FIG. 3, the functionality performed by the data storage management system 101 is now described in greater detail. All input items 303 in the input dataset 301 are transformed into output items 307 in the output dataset 305. As noted above, the output dataset 305 consists of a plurality of levels. In order to transform the input items 303, certain qualities concerning each level starting from the first (referred to herein as level 0) to the last are calculated. A level size calculating module 311 of the data storage management system 101 calculates the maximum number of output items 307 storable on the current level. As noted above, the maximum number of output items 307 storable on a given level is only equal to the number actually stored on that level when the optimal shifting value for the level results in the level being filled to maximum occupancy. Because a level can be filled to maximum occupancy, the output array for each level is sized according to the maximum number of output items 307 that can be stored on the current level.

To calculate the maximum size of a level, the level size calculating module 311 first calculates the size exponent for that level, which, as noted above, is the power to which 2 is raised to determine the maximum level size. Calculating the size exponent involves estimating a fraction of the remaining items (those input items 303 not yet transformed into output items 307) on which to target the maximum size to use for the current level. Typically, the estimated fraction to use is in the range from ½ to ⅓, although different values can be used in other embodiments. Thus, the size exponent is calculated as log 2 of the estimated fraction of the remaining items (rounded to the nearest integer). Thus, where r represents the number of remaining items and the estimated fraction is ½, the size exponent can be calculated as log 2(r/2), rounded to the nearest integer.

In some embodiments, the level size calculating module 311 employs an optional optimization, which increases maximum sizes for the bottom most levels (the word "bottom" is being used in this context relative to level 0 being considered the top). The optimization involves adding a small optimization factor to r/e, where r is the number of remaining items and e is the denominator of the estimated fraction. This optimization factor starts as 0 for the top level, and increases progressively for lower levels. For example, the optimization factor can be calculated as n−r over a constant corresponding to the estimated fraction (e.g., 150 where the estimated fraction is ½) where n is the total number of input items 301, and r is the number of remaining items. When the size of level 0 is calculated, n and r are equal, thus the optimization factor is 0, and the calculated size is still based on the un-optimized fraction (e.g., ½).

As the size for subsequent levels is calculated, n remains the same and r decreases, so n−r increases, resulting in lower levels with larger estimated fractions, and consequently larger maximum sizes than what they would be absent the optimization factor. Recall that subsequent levels store progressively fewer output items 307 from a progressively smaller pool of remaining items. Thus, it typically is desirable to increase the estimated fraction for lower levels. This is so because as the pool of remaining items becomes very small, progressively larger percentages of the progressively smaller pool can be stored per level.

It is also desirable to ensure that each level is an adequate size in absolute terms (i.e., the level can store a minimum number of output items 307). To do so, the level size calculating module 311 can ensure that the size exponent is always of a sufficient, minimum size (for example 3), resulting in levels of a corresponding requisite size (e.g., 8 or $2^3$ where the minimum size exponent is 3). The specific value to use for the minimum size exponent in a given embodiment is a variable design parameter. If the calculated size exponent for the current level is not of the minimum size, the level size calculating module 311 sets the size exponent to the minimum size. The level size calculating module 311 then calculates the maximum size of the current level by raising 2 to the size exponent.

In some embodiments, the level size calculating module 311 applies an additional optional optimization to ensure that the bottom most levels do not become too large. To do so, the level size calculating module 311 can compare the number of remaining items to the calculated maximum size for the current level. Where the number of remaining items are fewer than the maximum size for the current level by more than a given amount, the level size calculating module 311 can lower the maximum size and decrement the calculated size exponent for the current level. The requisite difference between the number of remaining items and maximum size for a given level considered sufficient to make such adjustments is a variable design parameter, as is the extent of any adjustments to make. Typically, where this optimization is employed, it is configured only to affect the last two or three levels.

In addition to calculating a size for the current level, an optimal shifting value to use for the mixing function for the current level is determined. More specifically, a shifting value determining module 313 of the data storage management system 101 determines an optimal shifting value for the current level by trying each possible shifting value, until a shifting value is found that enables the storing of the maximum number of output items 307 on the current level, or each possible shifting value has been tried. If no possible shifting value enables the storing of the maximum number of output items 307 on the current level, then the shifting value that enables storing the most output items 307 is classified as being optimal for the current level. Because it is the bits of the input items 303 that are being shifted according to the shifting value, the number of possible shifting values equals the width of the input items−1, and range in value from 1 to w−1 where w is the width of the input items 303 in bits.

To determine the optimal shifting value, the shifting value determining module 313 simulates storing the remaining input items 303 from the input dataset 301, by calculating storage addresses (indexes into the output array for the current level) for each remaining item using a given shift value. The shifting value determining module 313 keeps track of the number of unique addresses generated for that level with the given shifting value. If a shifting value is found that generates a number of unique addresses equal to the maximum size for the current level, that shifting value is optimal and the shifting value determining module 313 stops testing possible shifting values for that level. Otherwise, the shifting value determining module 313 continues generating storage addresses for the remaining input items 303 using each possible shifting value from 1 to w−1, and keeps track of how many unique addresses are generated with each possible shifting value. The shifting value determining module 313 then determines that the shifting value that resulted in the generation of the most unique addresses is the optimal shifting value for the current level. The shifting value determining module 313 saves this optimal shifting value in association with the current level (for example, by maintaining an array of optimal shifting values, one for each level starting with level 0). The number of output items 307 that can be actually stored on a given level is equal to the number of unique addresses the optimal shifting value generates for that level. This can be thought of as the "actual size" of the level. Note that the actual size of a given level can but need not be equal to its maximum size, depending upon whether the optimal shifting value actually results in filling the level.

Describing the process of simulating the storing of the remaining input items 303 from the input dataset 301 in greater detail, for each shifting value starting with 1 until an optimal shifting value is found, a mixing module 315 of the data storage management system 101 applies the mixing function to each remaining item using the optimal shifting value. As described above, to apply the mixing function with a given shifting value to an input data item 303, the bits of the input data item 303 are right shifted by the shifting value, and an exclusive or (XOR) operation is performed on the original input item 303 and the result of the right shift operation. An address generating module 317 of the data storage management system 101 then generates a storage address by masking the result of the XOR operation so as to retain only the size exponent least significant bits. These bits are used as a storage address (i.e., an index into an array of output items for the current level). As explained above, this storage address encodes the data from the input item 303 that is not explicitly included in the output item 307. However, at this point no output items 307 are actually being stored, as the optimal shifting value for the level is still being determined. Thus, the shifting value determining module 313 instead tracks the storage addresses generated by remaining items with the current shifting value, as well as the number of remaining items that generate unique storage address (this is the actual number of items that could be stored at the current level using the current shifting value). Where a given generated address has not been previously generated by another remaining item with the current shifting value, the shifting value determining module 313 increments the number of items that could be stored at the current level with the current shifting value. Where a previous remaining item has already generated a given storage address at the current level with the current shifting value, a collision has occurred and the number of items that could be stored is not incremented. By performing this process with each possible shifting value, the optimal shifting value for the current level is determined.

Once the optimal shifting value for a given level has been determined, in some embodiments a level size verifying module 319 of the data storage management system 101 verifies that the values calculated for the level (which, as described above, are partially based on some estimates) meet certain requisite conditions. More specifically, the level size verifying module 319 can ensure that the optimal shifting value determined for the current level results in the level being filled to a minimum percentage. The language "a level being filled to a percentage" as used herein refers to the actual size of a level as a percentage of its maximum size. The specific minimum percentage to which a level is to be filled is a variable design parameter, but can start at around, e.g., 95% to 98% for level 0 and be progressively decreased for subsequent levels. The percentage is decreased because subsequent levels are of decreasingly smaller maximum sizes as described above, and so can be less full than levels with larger maximum sizes without resulting in much empty storage. The initial minimum percentage to use is a variable design parameter and can vary between embodiments, as can the rate at which to decrease the minimum percentage (or whether to decrease it at all) for subsequent levels. Higher minimum percentages result in the use of less storage space but slower performance. As levels become smaller, leaving them less full becomes less and less of a concern. Where the requisite conditions described above are not met, the level verifying module 319 can lower the value of the size exponent, thereby decreasing the maximum size of the level. Note that the level verifying module 319 does not decrease the size exponent below the minimum size (described above), thereby ensuring that the current level does not go below the minimum size.

In any case, the level size calculating module 311 stores the calculated size exponent for the current level. The level size calculating module 311 can store the size exponents by, for example, maintaining an array of size exponents, one for each level starting with level 0.

A level loading module 321 of the data storage management system 101 loads output items 307 into the output array for the current level. As noted above, the output array for the current level is sized to hold the maximum number of output items 307 storable on the current level. To load the output array, the level loading module 321 processes remaining input items 301. An output item creating module 323 of the data storage management system 101 creates output items 307 by transforming input items 301. The level loading module 321 stores the created output items 307 at the current level. Describing the creation of output items 307 more specifically, the mixing module 315 applies the mixing function to each remaining input item 303 using the optimal shifting value for the current level. The address generation module 317 then masks the result using the size exponent for the current level to generate a storage address in the form of an index into the output array for the current level. If an output item 307 is already stored at this index in the output array for the current level, a collision has occurred and the input item 303 in question remains for processing at a subsequent level (In some embodiments, the level loading module 321 checks for and skips over duplicates in the input dataset 301.) If the index into output array for the current level refers to an empty element, the level loading module 321 right shifts the output of the mixing function for the current input item 303 by the size exponent, and stores the result as the corresponding output item at the index. The level loading module 321 performs this right shift to shift out the size exponent lowest order bits since they are already encoded in the address, and thus need not be stored in the output item 307. Where a remaining input item 303 is transformed into a stored output item 307, the input data is updated to indicated that the item in question is no longer remaining to be processed. By performing this processing for all remaining input items 303, the level loading module 321 loads the output array for the current level with output items 307.

The above described per level processing is repeated for subsequent levels, until all remaining input items 303 have been stored as output items 307. The output of this processing is an array of arrays, one for each level. Each level array stores the output items 307 for that level, at indexes encoding the content of the corresponding input items 303 not included in the output items 307 themselves. Additionally, an array of the optimal shifting values for each level and an array of calculated size exponents for each level are maintained as described above, and this information is also part of the output dataset 305. It is to be understood that in other embodiments different suitable data structures are used to store the output dataset 305. In any case, once created the output dataset 305 can be written to one or more files for subsequent access of the data therein.

Table 1 is a listing of pseudo code for performing the functionality described above in conjunction with FIG. 3 according to one embodiment. It is to be understood that the pseudo code is Table 1 is an example of an implementation of the functionality of FIG. 3 according to one embodiment. As such, it includes various implementation details which can be instantiated other ways in other embodiments (e.g., specific data structures, variable names, variable design decisions, etc.). The pseudo code also uses specific values for certain variable design parameters (e.g., 3 for the minimum size exponent, ½ for the estimated fraction, etc.) whereas other values would be used in other embodiments. Additionally, the pseudo code uses certain optimizations which can be absent or varied in other embodiments.

TABLE 1

```
input[n]        // input is the input dataset
u               // u is an index into the input
```

TABLE 1-continued

```
n               // n is the number of input items
w               // w is the width of the input items
r               // r is the number of remaining input items
b               // b is the size exponent
bx              // bx is a level size correction value
c               // c is the maximum number of output items
                // storable on the current level
m               // m is the actual number of outputs items stored
                // on a given level
mc              // mc is used to track the number of output items
                // being stored on the current level
s               // s is the current shifting value
lbm[ ]          // lbm is a bit map used to track processed items
sa[ ]           // sa is an array of level shifting values
lsa[ ]          // lsa is an array of level size exponents
l               // l is the number of the current level
idx             // is an index
key             // key is used to hold an output item
output[ ][ ]    // output is an array of arrays of output items
                // stored on successive levels
l = 0           // first level
bx = 0          // correction value starts at 0
r = n           // items remaining is initially all
// so long there are input items remaining to be processed
while (r)
{
    // estimate the size exponent for the current level
    // here 1/2 is used as the estimated fraction
    // here an optional optimization is used to
    // increase maximum sizes for bottom most levels
    b=log2i(r/2 + ((n-r)/150))
    // set size exponent to minimum size if need be
    if (b < 3)
        b = 3
    c = 1<<b // set maximum items storable on this level to $2^b$
    mc = 0 // items stored on this level so far = 0
    // this while loop is an optimization to ensure the last
    // several levels do not have overly large maximum sizes
    while ( (c/21) > r ) {--b; c >>= 1}
    // outer for loop tries each possible shifting value s for
    // this level to find optimal shifting value
    for ( s=1; s < w; ++s )
    {
        // lbm is a bitmap for the current level, initialize
        // all items to OFF
        lbm[0..c] = OFF
        // inner for loop iterates through input data with
        // current shifting value s and simulates adding output
        // items to current level to determine how many could be
        // stored with this current s. m is number of items
        // processed, u is index into input data and r is
        // remaining number of input items
        for ( m=0, u=0; u<r; ++u )
        {
            // apply the mixing function and mask, and assign the
            result to the index into the output array
            idx = input[u] ^ (input[u]>>s)&((1<<b)-1)
            // check to see if another input item already generated
            this index value. if so, lbm[idx] will be initialized
            if ( lbm[idx] == OFF )
            {
                // if index value unique, initialize to non-zero
                lbm[idx] = ON
                // and increment number of items processed with this
                s, and check whether level full
                if ( ++m == c )
                {
                    sa[l] = s // if level full save current s
                    lsa[l] = mc = m // and save level size
                    // we have found an s that fills the level so break
                    // out of outer for loop, s is optimal for level
                    goto done_level
                } // else level not full
            } // else index value already used, this input item
            // cannot be stored at this level with this s
        } // end inner for loop, we are done with current s
        // does current s generate best occupancy for this level
        // of values tried so far?
        if ( m > mc )
        {
```

TABLE 1-continued

```
        sa[l] = s    // if so, save current s
        mc = m       // and save level size
     }
  } // end outer for loop, we are done trying values for
    // s for this level
  // we have found optimal size for current level
  done_level:
  // ensure current s resulted in level being full to
  // requisite percentage which decreases as level being
  // processed increases, without letting size exponent
  // drop below minimum value
  if ( b > 3 and mc*100.0/c < 97.5 - (n/r - 1.0) )
  {
     // if not, increase level size correction value to lower
     // the level size
     ++bx
     b -= bx
  }
  lsa[l] = b       // save size exponent for this level
  bx = 0           // reset size exponent correction value
  s = sa[l]        // retrieve optimal s for current level
  // initialize level array (-1 indicates unused)
  output[l][0..c] = -1
  // move data from input to output for the current level
  for ( u=0; u<r; ++u )
  {
     // apply mixing function with optimal s to input item
     key = (input[u] ^ (input[u]>>s))
     // calculate index into output array for current level by
     // masking result
     idx = (key &((1<<b)-1)
     // if calculated index value is not already occupied
     // right shift the mixed data and store at calculated
     // index, i.e., b lowest order bits of input item are
     // shifted out because they are encoded in index
     if ( output[l][idx] == -1 )
     {
        output[l] [idx] = key >> b
        // update the input to remove the transformed
        // input data
        update_input( )
     }
     // if we have a duplicate in input, ignore it
     else if ( output[l][idx].key != key >> b ) update_input( )
     // otherwise we have a collision, keep input item in
     // the input to be processed with next level
  } // we are done with current level
  r -= mc          // decrement remaining items by number stored
  ++l              // increment level
} // we are done with all input items
// write the output to a file
// an array of arrays of output items (levels)
// and an array of shifting values used per level
// and an array of level size exponents
write(output, sa, lsa)
```

In order to search for a data item with given content in the output dataset 305, each level is searched as followed. For each level l, the index idx the content would have at that level is calculated as idx=(content ^ (content >>sa[l]))&((1<<lsa[l])−1). In other words, the mixing function is applied to the content using the optimal shift value for the given level, and the result is masked using the size exponent for the current level. This results in what the index for the content will be if it is stored on the current level. That index into the array of data items for the current level is then examined. If the level array at the index is empty, the content is not in the output dataset 305 at all. This is known because the content would only be stored on a subsequent level if it collides with other stored content at the current level, in which case the index at the current level would not be empty. If the level array at the index is not empty, its content is compared to the content right shifted by the size exponent for the current level. In other words, the section of the content not encoded in the index is compared to the content stored at the index. If there is a match, the current level contains the content at the index. If the shifted content does not match the content stored at the index into the level array, the next level is checked. This is repeated for subsequent levels, until the content is found or it is determined that the content is not in the output dataset 305.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats.

The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for transforming an input dataset comprising a plurality of input items into a smaller output dataset comprising a plurality of corresponding output items by encoding some content in storage addresses of the output items in the output dataset, the method comprising the steps of:

for each of the plurality of input items in the input dataset, creating, by a computer, a corresponding output item, wherein each input item contains some content that is not present in the corresponding output item;

encoding, by the computer, the content contained in each input item that is not present in the corresponding output item in a storage address of the corresponding output item in the output dataset, wherein the content contained in each input item that is not present in the corresponding output item comprises a specific number of least significant bits of the input item; and storing, by the computer, each output item at its storage address in the output dataset;

wherein the content of each input item is contained in a combination of the corresponding output item and the storage address of the corresponding output item; and wherein each input item has a width greater than that of the corresponding output item.

2. The method of claim 1 further comprising:

storing, by the computer, the output items in a plurality of levels of the output dataset, wherein a first level contains a given number of output items of a given width, wherein each successive level contains output items of a greater or equal width, and wherein numbers of items contained per level decreases with successive levels.

3. The method of claim 2 further comprising:

calculating, by the computer, a maximum number of output items that can be stored at each level of the output dataset.

4. The method of claim 2 further comprising:

calculating, by the computer, a size exponent for each level of the output dataset.

5. The method of claim 2 further comprising:

determining, by the computer, an optimal shifting value for each level of the output dataset.

6. The method of claim 5 wherein determining, by the computer, an optimal shifting value for a level of the output dataset further comprises:
- generating storage addresses, by the computer, for remaining data items at the level using each possible shifting value; and
- identifying, by the computer, a shifting value that results in generating a greatest number of unique addresses for the remaining data items at the level.

7. The method of claim 5 wherein determining, by the computer, an optimal shifting value for a level of the output dataset further comprises:
- generating storage addresses, by the computer, for remaining data items at the level using at least one possible shifting value; and
- identifying, by the computer, a shifting value that results in generating a number of unique addresses for the remaining data items at the level equal to a maximum number of output items that can be stored at the level.

8. The method of claim 2 wherein:
- creating an output item corresponding to an input item that contains some content that is not present in the output item further comprises applying a mixing function with a given shifting value to the input item, by the computer; and
- encoding the content contained in an input item that is not present in the corresponding output item in the storage address of the output item further comprises assigning, by the computer, a specific number of least significant bits of the input item to the storage address of the output item, wherein the specific number comprises a difference in width between the input item and the corresponding output item.

9. The method of claim 8 wherein applying a mixing function with a given shifting value to the input item further comprises:
- right shifting the bits of the input item by the shifting value, by the computer; and
- performing, by the computer, a bitwise exclusive or operation on the input item and the results of the right shifting.

10. At least one non transitory computer readable storage medium storing a computer program product for transforming an input dataset comprising a plurality of input items into a smaller output dataset comprising a plurality of corresponding output items by encoding some content in storage addresses of the output items in the output dataset, the computer program product comprising:
- program code for creating, for each of the plurality of input items in the input dataset, a corresponding output item, wherein each input item contains some content that is not present in the corresponding output item;
- program code for encoding the content contained in each input item that is not present in the corresponding output item in a storage address of the corresponding output item in the output dataset, wherein the content contained in each input item that is not present in the corresponding output item comprises a specific number of least significant bits of the input item; and
- program code for storing each output item at its storage address in the output dataset;
- wherein the content of each input item is contained in a combination of the corresponding output item and the storage address of the corresponding output item; and
- wherein each input item has a width greater than that of the corresponding output item.

11. The computer program product of claim 10 further comprising:
- program code for storing the output items in a plurality of levels of the output dataset, wherein a first level contains a given number of output items of a given width, wherein each successive level contains output items of a greater or equal width, and wherein numbers of items contained per level decreases with successive levels.

12. The computer program product of claim 10 further comprising:
- program code for calculating a maximum number of output items that can be stored at each level of the output dataset.

13. The computer program product of claim 10 further comprising:
- program code for calculating a size exponent for each level of the output dataset.

14. The computer program product of claim 10 further comprising:
- program code for determining an optimal shifting value for each level of the output dataset.

15. The computer program product of claim 14 wherein the program code for determining an optimal shifting value for a level of the output dataset further comprises:
- program code for generating storage addresses for remaining data items at the level using each possible shifting value; and
- program code for identifying a shifting value that results in generating a greatest number of unique addresses for the remaining data items at the level.

16. The computer program product of claim 14 wherein the program code for determining an optimal shifting value for a level of the output dataset further comprises:
- program code for generating storage addresses for remaining data items at the level using at least one possible shifting value; and
- program code for identifying a shifting value that results in generating a number of unique addresses for the remaining data items at the level equal to a maximum number of output items that can be stored at the level.

17. The computer program product of claim 10 wherein:
- the program code for creating an output item corresponding to an input item that contains some content that is not present in the output item further comprises program code for applying a mixing function with a given shifting value to the input item; and
- the program code for encoding the content contained in an input item that is not present in the corresponding output item in the storage address of the output item further comprises program code for assigning a specific number of least significant bits of the input item to the storage address of the output item, wherein the specific number comprises a difference in width between the input item and the corresponding output item.

18. The computer program product of claim 17 wherein the program code for applying a mixing function with a given shifting value to the input item further comprises:
- program code for right shifting the bits of the input item by the shifting value; and
- program code for performing a bitwise exclusive or operation on the input item and the results of the right shifting.

19. A computer system for transforming an input dataset comprising a plurality of input items into a smaller output dataset comprising a plurality of corresponding output items by encoding some content in storage addresses of the output items in the output dataset, the computer system comprising:
- a processor;
- system memory;

an output item creating module residing in the system memory, configured to create, for each of the plurality of input items in the input dataset, a corresponding output item, such that wherein each input item contains some content that is not present in the corresponding output item;

an address generating module residing in the system memory, configured to encode the content contained in each input item that is not present in the corresponding output item in a storage address of the corresponding output item in the output dataset, wherein the content contained in each input item that is not present in the corresponding output item comprises a specific number of least significant bits of the input item; and a level loading module residing in the system memory, configured to store each output item at its storage address in the output dataset in a plurality of levels such that a first level contains a given number of output items of a given width, such that each successive level contains output items of a greater or equal width, and such that numbers of items contained per level decreases with successive levels;

wherein the content of each input item is contained in a combination of the corresponding output item and the storage address of the corresponding output item; and wherein each input item has a width greater than that of the corresponding output item.

20. The computer system of claim 19 further comprising:

a mixing module residing in the system memory, configured to create an output item corresponding to an input item that contains some content that is not present in the output item by applying a mixing function with a given shifting value to the input item; and wherein the address generating module is further configured to encode the content contained in an input item that is not present in the corresponding output item in the storage address of the output item by assigning a specific number of least significant bits of the input item to the storage address of the output item, wherein the specific number comprises a difference in width between the input item and the corresponding output item.

* * * * *